(12) United States Patent
Sonnenmann et al.

(10) Patent No.: US 9,423,483 B2
(45) Date of Patent: Aug. 23, 2016

(54) LOCATING DEVICE FOR LOCATING A SOURCE EMITTING A SHORT-DURATION HIGH POWER MICROWAVE PULSE

(71) Applicant: DIEHL BGT DEFENCE GMBH & CO. KG, Ueberlingen (DE)

(72) Inventors: Frank Sonnenmann, Nuremberg (DE); Adam Umerski, Nuremberg (DE)

(73) Assignee: Diehl BGT Defence GmbH & Co. KG, Ueberlingen (DE)

(*) Notice: Subject to any disclaimer, the term of this patent is extended or adjusted under 35 U.S.C. 154(b) by 386 days.

(21) Appl. No.: 14/095,171

(22) Filed: Dec. 3, 2013

(65) Prior Publication Data
US 2014/0152506 A1    Jun. 5, 2014

(30) Foreign Application Priority Data
Dec. 3, 2012 (DE) .................. 10 2012 023 627

(51) Int. Cl.
| | |
|---|---|
| G01S 3/50 | (2006.01) |
| G01S 3/46 | (2006.01) |
| G01S 5/04 | (2006.01) |
| G01S 5/06 | (2006.01) |

(52) U.S. Cl.
CPC .. *G01S 3/50* (2013.01); *G01S 3/46* (2013.01); *G01S 5/04* (2013.01); *G01S 5/06* (2013.01)

(58) Field of Classification Search
CPC .................................. G01S 1/02; G01S 3/14
USPC ........ 342/442, 444, 445, 463–465; 455/456.1
See application file for complete search history.

(56) References Cited

U.S. PATENT DOCUMENTS

| | | | |
|---|---|---|---|
| 5,523,767 A | 6/1996 | McCorkle | |
| 2003/0071754 A1* | 4/2003 | McEwan | G01S 5/06 342/464 |
| 2010/0079282 A1* | 4/2010 | Icove | G01K 11/006 340/561 |

FOREIGN PATENT DOCUMENTS

| | | |
|---|---|---|
| AU | 2011202973 A1 | 7/2011 |
| DE | 102006037209 B4 | 8/2010 |
| DE | 102011102568 A1 | 11/2012 |

* cited by examiner

*Primary Examiner* — Dao Phan
(74) *Attorney, Agent, or Firm* — Laurence A. Greenberg; Werner H. Stemer; Ralph E. Locher

(57) ABSTRACT

A locating device locates a source emitting a short-duration high power microwave pulse. The locating device contains at least three separately disposed receiving antennas that are not disposed on a line, each with an associated detection device for detecting the point in time of the reception at the antenna of the high power microwave pulse. At least one short time measurement device is provided for determining at least two time differences between the points in time of reception of each two of the detection devices. A computing device is provided for calculating a location of the origin of the high power microwave pulse based on at least two of the measured time differences.

10 Claims, 3 Drawing Sheets

LOCATING DEVICE FOR LOCATING A SOURCE EMITTING A SHORT-DURATION HIGH POWER MICROWAVE PULSE

CROSS-REFERENCE TO RELATED APPLICATION

This application claims the priority, under 35 U.S.C. §119, of German application DE 10 2012 023 627.1, filed Dec. 3, 2012; the prior application is herewith incorporated by reference in its entirety.

BACKGROUND OF THE INVENTION

Field of the Invention

The invention relates to a locating device for locating a source emitting a short-duration high power microwave pulse.

Attacks by microwave pulses can compromise the functionality of electronic circuits. It is therefore important to quickly detect and track sources of such attacks. Only in this case can timely protection and countermeasures be initiated. Active detection of the source, such as e.g. by radar is difficult, because there is often no available information about the nature of the source. It is therefore advantageous to detect such a source passively.

For the detection of electromagnetic radiation sources test equipment with long integration times is often used that detects quasi-continuously emitted microwave energy even at low levels. Such test equipment is used e.g. as an electrosmog warner for checking the sealing of microwave equipment or for measuring the emissions of mobile radio antennas. Such equipment is, however, not suitable for detection of short-duration high power microwave pulses, because weaker, continuously emitting radiation sources generate a larger measurement signal here than a high power microwave pulse that only has a very short duration.

A detection device for detecting an attack directed against the object with a short-duration high power microwave pulse is known from German patent DE 10 2006 037 209 B4. Here an untuned dipole is used as the antenna, which feeds an HF diode, wherein the response threshold of the HF diode, in relation to its short-duration integral over a few nanoseconds, is large enough so that it does not forward conduct at the receiving field strength of the permanent background radiation. Forward conduction of the HF diode is thus interpreted as detection of a high power microwave pulse. The publication also describes how the direction in which the source of the high power microwave pulse lies can be determined with an array of three antennas. The estimation of the range by a comparison of the reception amplitudes of individual detection devices is also described. An amplitude discriminating process for distance determination is, however, susceptible to scatter, shadowing and resonance effects.

SUMMARY OF THE INVENTION

The object of the present invention is thus to specify a locating device for locating a source emitting a short-duration high power microwave pulse that is improved in comparison.

The object is achieved by a locating device of the above-mentioned type, wherein the locating device contains at least three separately disposed receiving antennas that are not disposed on a line, each of which has an associated detecting device for detecting the point in time of the reception at the antenna of the high power microwave pulse. The locating device further has at least one short time measuring device for determining at least two time differences between the points in time of reception of two respective detection devices, and a computing device for calculating a point of origin of the high power microwave pulse based on at least two of the measured time differences.

The invention is based on the idea of using a method for determining the location for the source of the high power microwave pulse that is solely based on transition time differences of the microwave signal. The transition time of the microwave pulse is less sensitive to scatter, shadowing and resonance effects. Shadowing and resonance effects mainly affect the signal amplitude; in the case of scatter effects multiple occurrences of the pulse can occur during reception, but here it is sufficient to only take the first detection into account.

The determination of a location using transition time differences will initially be explained with the use of two antennas. If two antennas are used, then a time difference when receiving a signal, based on a constant speed of propagation of electromagnetic waves, corresponds to a different distance of the source from the two antennas. Thus no absolute distance is known, but a difference of the distance between the source and the first antenna and the source and the second antenna is known. The curve of the points whose absolute difference of the distances to two specified points is constant is the hyperbola. Here the two antennas correspond to the focal points. Because the sign of the distance is known here, i.e. it is known which of the two antennas receives the signal first, the location of the source is limited to one branch of the hyperbola. If the distance between the source and one of the antennas is much greater than the distance between the antennas, a condition that is generally fulfilled by the detection of an attack with high power microwave pulses, then instead of a hyperbola the asymptote of the hyperbola can be used approximately. It is thus possible to determine two directions with two antennas, wherein the source of the high power microwave pulse lies in one of the directions.

Now if three antennas are available then a hyperbola branch or two directions can be calculated from the transition time difference between the first and the second or the first and the third antennas in each case. The hyperbola branches or half-lines originate from different points. It is thus possible to determine points of intersection between the hyperbola branches or half-lines. One of the points of intersection describes the position of the source of the high power microwave pulse. The correct point of intersection can be determined by taking into account the detection sequence of the antennas.

In this process a consistency check can already be carried out when using the minimum necessary three antennas. If the measured time interval between the points in time of reception of two antennas corresponds to a distance that is greater than the distance between the antennas, then it follows that there is a measurement error. With three antennas the source of the high power microwave pulse is already fully determined. Nevertheless, greater robustness of the method is desirable. In the simplest case greater robustness of the method can be achieved by using more antennas. In addition, a greater distance between the antennas reduces the measurement error. A greater distance between the antennas, however, hampers the short time measurement at the same time. Microwave signals propagate at the speed of light. With a distance between the antennas in the meter range the time interval to be measured is thereby in the nanosecond range. For such very short time intervals it is advantageous to keep cable lengths short and to avoid additional conversions of the signal or even wireless transmission.

In order to nevertheless exploit the advantages of large antenna separations or many antennas, it is advantageous to dispose the antennas as a cluster. In this case the measurement of a transition time difference only takes place between a few closely adjacent antennas and parameters are only exchanged between the clusters that describe directions or areas in which the source is located. The information exchange between clusters is thereby not time-critical.

The required high sensitivity of the time measurement also requires good adjustment of the measurement setup, both with regards to transition times and also with regards to the sensitivity of the individual detection devices. Besides a preselection of such adjusted components, calibration of the equipment is also necessary here. This is possible in numerous ways. If e.g. groups of antennas are mounted in a housing in a fixed manner and the measurement of time differences is only carried out for antennas disposed within the same housing, then pre-calibration during manufacture of the antenna cluster is possible. Thus following manufacture of the cluster test sources can be used in different directions and distances in order to carry out the calibration.

In particular, if a time measurement between individually constructed antennas is to be carried out, e.g. on a building, it is advantageous if a calibration is carried out using test sources following construction of the locating device. Alternatively, permanently attached test sources can also be provided on the locating device, especially as part of an antenna cluster. This enables self-calibration without additional equipment. This is especially advantageous if the locating device is to be used in a mobile manner.

One possibility of the construction of the locating device is that the receiving antennas are untuned dipoles and the detection devices contain an HF diode whose response threshold is at least so high that the HF diode, in relation to a short time integral over a few nanoseconds, only conducts above the receiving field strength of a permanent background radiation. Because relatively strong signals are to be measured by the locating device, the use of an antenna with a high antenna gain is not necessary. Thus untuned, very small dipole antennas with an omnidirectional characteristic can be used. In addition it is advantageous if the field strengths are detected both horizontally and also vertically, i.e. in both mutually orthogonal polarizations. Thus a measurement e.g. using D-dot probes as a differential measurement of the time derivative of the instantaneous electric field is possible. Such probes are commercially available and are in use. A detection by a HF diode is advantageous, because here the forward conduction of the diode can be directly evaluated as a reception signal. Because a steep rising edge is to be expected with high power microwave pulses, small differences in the response point of the HF diodes of the various detection devices are less problematic. Nevertheless, tuning of the HF diode, e.g. by using additional electronic components or selection of the diodes, can be advantageous.

It is especially advantageous if at least two separately disposed clusters of receiving antennas are provided, wherein each cluster of receiving antennas contains at least two, preferably three, receiving antennas. The robustness of the method can be significantly improved by using a plurality of clusters of receiving antennas. When there are at least two receiving antennas, an area can be determined in which the high power microwave pulse emitting source is disposed by each of the clusters of receiving antennas, preferably by a short time measuring device disposed directly on the cluster. Thus a hyperbola or two directions, on which or in which the source emitting the high power microwave pulse lies, can be directly determined for the cluster. If no dedicated computing device is provided on the cluster of receiving antennas, it is however also sufficient to determine only one time difference and to transmit this to a computing device. A cluster of receiving antennas can thus act as an at least partially closed system that requires no time-critical external communications.

It is especially advantageous if a cluster of receiving antennas contains at least three receiving antennas. In this case the position of the source of the high power microwave pulse can be determined with just one cluster of receiving antennas. However, because the antennas of a cluster of receiving antennas are generally disposed closely adjacent to each other, this measurement is generally highly erroneous. Thus if there are at least two of the clusters of receiving antennas available, then e.g. a direction can be determined with each cluster of receiving antennas and the point of intersection of the directions can be determined as the location of the source emitting the high power microwave pulse. This enables a significantly improved accuracy to be achieved. In the simplest case a third antenna provided in a cluster of receiving antennas can be used here for a consistency check of the measurement. However, it is also possible to use the additional data for error estimation.

The distance between each two clusters of receiving antennas can be at least twice, preferably at least three times, larger than the distance between the receiving antennas within a cluster of receiving antennas. This is especially advantageous if each of the short time measurement devices is configured for the measurement of the time differences between the points in time of reception of detection devices that are associated with the receiving antennas of the same cluster of receiving antennas. In this case it is possible that the otherwise conflicting design requirements of a large antenna separation in order to achieve large transition time differences that can thus be measured well and a compact, positionally fixed disposition of the antennas in order to achieve a highly invariant fixed distance with small transition time differences are simultaneously fulfilled. Thus e.g. a location and an angle between the line connecting two antennas of the cluster of antennas and the direction of a source emitting a short-duration high power microwave pulse can be determined for each cluster of receiving antennas. A large separation of the two clusters of receiving antennas enables in this case a less acute intercept angle of the connecting lines between the cluster of receiving antennas and the source. This enables more accurate determination of the location. At the same time the at least two antennas of a cluster are disposed relatively close together, whereby large signal transition times between antenna, detector and short time measuring device can be avoided. This enables more accurate time measurement.

It is also possible that the or another computing device for determining an area of origin, which contains the location of the origin of the high power microwave pulse to be calculated, is configured for each antenna cluster and the location of the origin is determined as an intersection of at least two areas of origin.

It is thus possible that each of the clusters of receiving antennas not only contains a dedicated short time measuring device, but also a dedicated computing device. In this case it is possible that clusters of receiving antennas can also be operated individually and where there is a plurality of clusters of receiving antennas the quality of location is improved. The areas of origin can take the form of one or two half-lines, a hyperbola or a hyperbola branch, wherein the width of the area perpendicular to the half-line or the hyperbola corresponds to a tolerance interval. A hyperbola or a hyperbola branch can in this case describe exactly in which area the short-duration high power microwave pulse emitting source should be disposed according to the measurement values. In many cases, however, it can also be desired to use the asymptote of the hyperbola as an approximation to the hyperbola. This allows the direction of an attack to be determined directly with a single cluster of receiving antennas.

The determination of areas by each cluster of receiving antennas is particularly advantageous, because probability distributions can be determined alternatively or additionally here. If e.g. it is determined that the data quality is poor in a cluster of receiving antennas, because individual receiving antennas do not receive the high power microwave pulse or receive it at a time that does not appear to be consistent with the times of the other antennas, then a widely spread probability distribution can be determined by the computing device. If by contrast a very high signal quality is determined, which can be determined e.g. from a noise level or the gradient of a rising edge, then a very sharply bounded area can be determined. The determined error can also depend on the angle. With at least three receiving antennas in the cluster of receiving antennas it is also possible to directly determine a location at which the high power microwave pulse emitting source is disposed. Because the time interval values are erroneous, a probability distribution, e.g. a Gaussian distribution, is advantageous here in order to determine the area. In this case the computing device can calculate an overall probability distribution from a plurality of probability distributions that were each determined by a cluster of receiving antennas, and thus determine the position of the high power microwave pulse emitting source very accurately. Also in the case in which areas of origin are already calculated, it can be advantageous to use the determined time intervals additionally to e.g. carry out consistency checks between the reception times of the antenna cluster.

It is also advantageous if the computing device is configured for wired or wireless reception of the data from at least some of the short time measurement devices or other computing devices by a communications device, wherein the data are time differences or variables calculated from time differences, especially variables that describe the areas of origin. A significant advantage of using a location device that only measures time intervals within a cluster of receiving antennas is that the communication between the clusters is not time critical. Indeed, overall a timely representation of a calculation result for users takes place, but reaction times in the millisecond range represent no problem here. In contrast, the measurement of transition time differences requires a time resolution in the nanosecond range. By determining the time differences between the points in time of reception within the cluster the communications within the locating device are thus essentially less time critical. This allows a plurality of communications channels between the antenna clusters. The communications can thus e.g. take place in digitized and wired form, but wireless digital or analogue data transmission is also possible. In the simplest case only time differences and the identification of the corresponding short time measuring device are transmitted. Often it is also advantageous, however, to transmit already calculated variables that parameterize an area in which the source is disposed.

Other features which are considered as characteristic for the invention are set forth in the appended claims.

Although the invention is illustrated and described herein as embodied in an locating device for locating a source emitting a short-duration high power microwave pulse, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
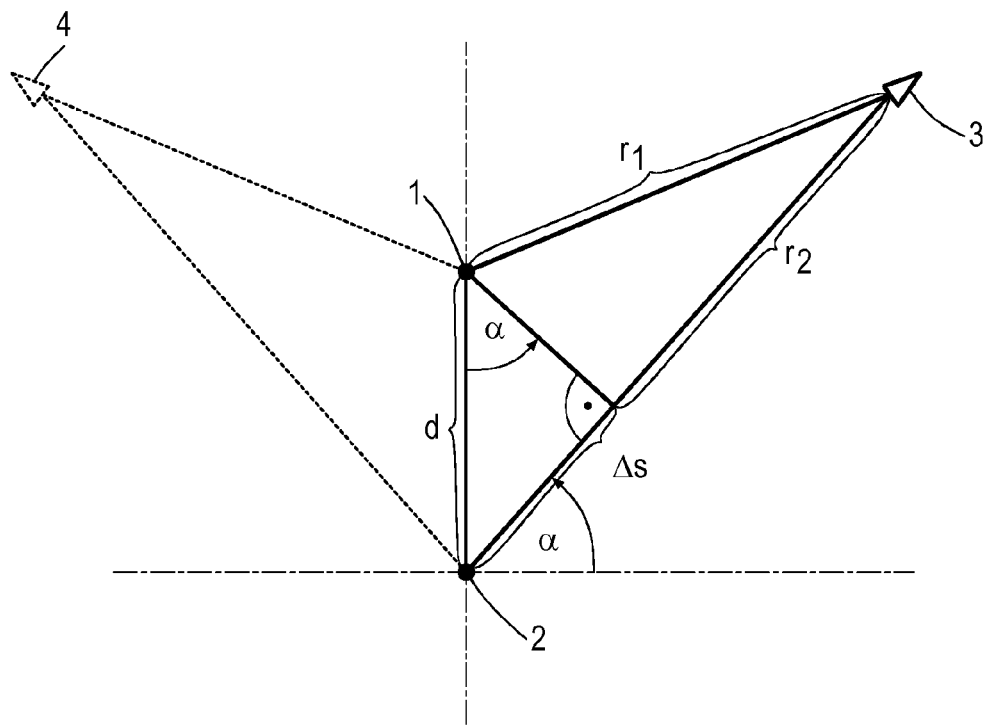
FIG. 1 is a schematic illustration for calculating a direction to a source of a short-duration high power microwave pulse from a transition time difference to two antennas.

Referring now to the figures of the drawing in detail and first, particularly, to FIG. 1 thereof, there is shown a schematic illustration for calculating a direction to a short-duration high power microwave pulse emitting source from a transition time difference to two receiving antennas. The two receiving antennas 1, 2 are disposed at a distance d from each other. A source 3 of a short-duration high power microwave pulse is disposed at distance $r_1$ from receiving antenna 1. The distance to receiving antenna 2 is $\Delta s + r_2$. For simpler illustration here the approximation will be used that the distance between the receiving antennas 1 and 2 is several times smaller than the distance between one of the receiving antennas 1, 2 and the source 3. In this case $r_1$ and $r_2$ are approximately equal. The approximation corresponds to an approximation to the hyperbola by its asymptote. In this case $\sin \alpha = \Delta s : d$. However, it should be noted here that an (imaginary) source 4, which is disposed on the other side of the connecting line of the receiving antennas 1, 2, would lead to an exactly equal transition time difference. The calculated direction thus remains ambiguous. In addition no distance can be determined, because any source that lies on a hyperbola with the corresponding transition time difference would lead to the same transition time difference.

Figure 2:
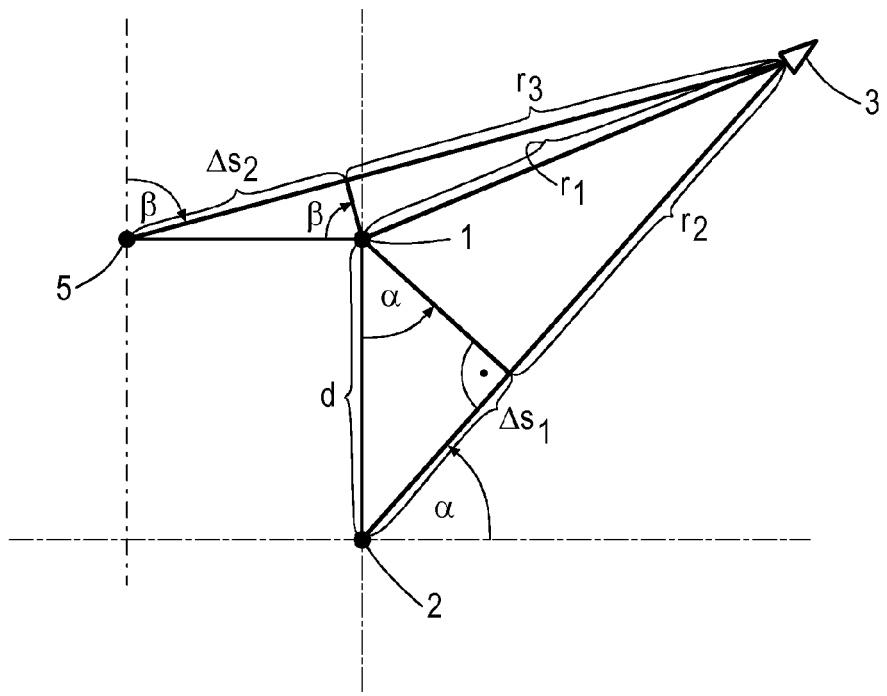
FIG. 2 is a schematic illustration for calculating a location of the source of the short-duration high power microwave pulse from the transition time differences between three receiving antennas.

German patent DE 10 2006 037 209 B4 uses the calculation of another probe to eliminate the ambiguity shown in FIG. 1. A similar arrangement is shown in FIG. 2. In the prior art the additional receiving antenna 5 is only used to determine whether the source 3 is disposed to the left or right of the connecting line of the two receiving antennas 1 and 2. In a development it is however possible to directly determine a location of the source 3 from the transition time differences between the receiving antennas 1, 2 and 5. In this case the angle α between the horizontal axis and the connecting line between the receiving antenna 2 and the source 3 is also calculated as in the preceding case with two receiving antennas. If three receiving antennas are provided, however, an angle β between the connecting lines between receiving antenna 5 and source 3 and the vertical axis can also be calculated. The location of the source 3 can then be determined as the point of intersection of the two determined lines.

Here it should be noted that the ambiguity of the direction initially continues to occur. If, as in FIG. 1, the second possible direction is drawn starting from the connecting line between receiving antennas 1 and 2 and in addition the second possible direction is drawn starting from the connecting line between receiving antennas 1 and 5, four points of intersection occur. The four points of intersection, however, lie in the figure to the right of and above receiving antenna 1, to the right of and below receiving antenna 1, to the left of and below receiving antenna 1 and to the left of and above receiving antenna 1. By taking into account the sign of the transition time difference between receiving antenna 1 and 2 or receiving antennas 5 and 1, the correct point of intersection can be selected. This allows resolution of the ambiguity and a unique location for the short-duration high power microwave pulse emitting source can be determined.

If the location is to be improved especially for short distances between the source and the antennas, it is also possible instead of a pure direction calculation to carry out an explicit calculation for hyperbolas and their points of intersection. In general the distances between antennas are, however, in the meter range, and the source is disposed at a relatively large distance. Pure direction determinations are thus generally adequate.

Figure 3:
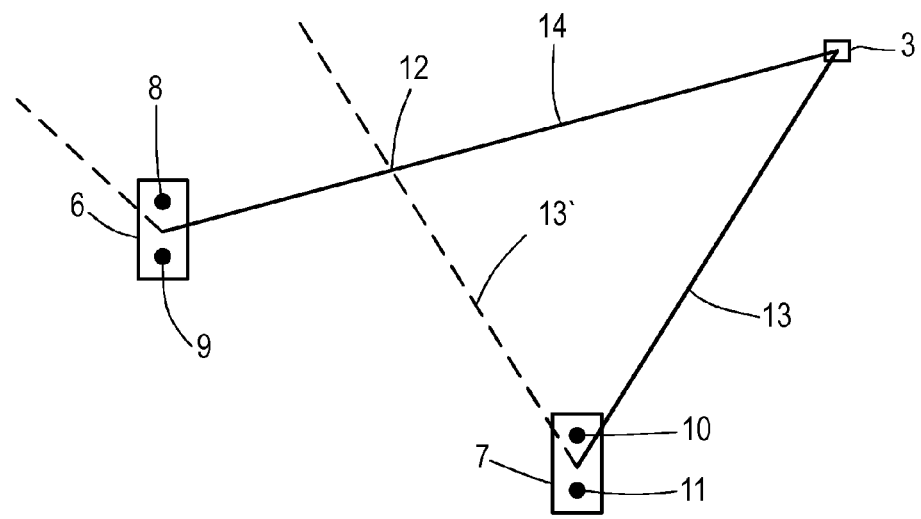
FIG. 3 is a schematic illustration for calculating the location of the source of the short-duration high power microwave pulse using two clusters of receiving antennas, each containing two receiving antennas.

FIG. 3 shows a schematic illustration of an exemplary embodiment of a locating device according to the invention that contains two clusters of receiving antennas 6, 7, each containing two antennas 8, 9 and 10, 11. A direction 13 to the source 3 can be determined from the time difference between the points in time of reception of the receiving antennas 10 and 11 in the cluster of receiving antennas 7. However, the direction is ambiguous here too, so that the source 3 could also lie in the direction 13'. A direction 14 to the source 3 is determined from the time difference between the points in time of reception of the receiving antennas 8 and 9 of the cluster of receiving antennas 6. The source 3 lies at the point of intersection of directions 13 starting from cluster of receiving antennas 7 and direction 14 starting from cluster of receiving antennas 6. The source 3 can, however, not be located unambiguously, because as long as only time differences between times of reception within individual clusters of receiving antennas 7, 6 are used, it cannot be unambiguously determined whether the source 3 lies at the point of intersection of directions 13, 14 or at the point of intersection 12 of the directions 13', 14. It is thus necessary here to use at least one time difference between the points in time of reception of one of the receiving antennas 8, 9 in the cluster of receiving antennas 6 and the point in time of reception of one of the receiving antennas 10, 11 in the cluster of receiving antennas 7.

Nevertheless, the use of two clusters of receiving antennas is advantageous. An accurate determination of time differences of points in time of reception is only necessary within a cluster of receiving antennas. Because the distances here are short, a locally disposed short time measuring device can be used advantageously. This makes a very accurate determination of a direction possible. With a greater distance between the clusters of receiving antennas 6 and 7, the location of the source 3 can be determined more accurately than with a more closely disposed arrangement of three receiving antennas. The elimination of the ambiguity between the points 12 and the point 3, at which the source is actually disposed, requires a significantly lower time resolution. This results in any inaccuracies in the time measurement during the comparison of the points in time of reception of receiving antennas 8, 9 in the cluster of receiving antennas 6 and receiving antennas 10, 11 in the cluster of receiving antennas 7 being hardly relevant. Overall by using two clusters of receiving antennas a definite improvement in location determination is thus possible here.

Figure 4:
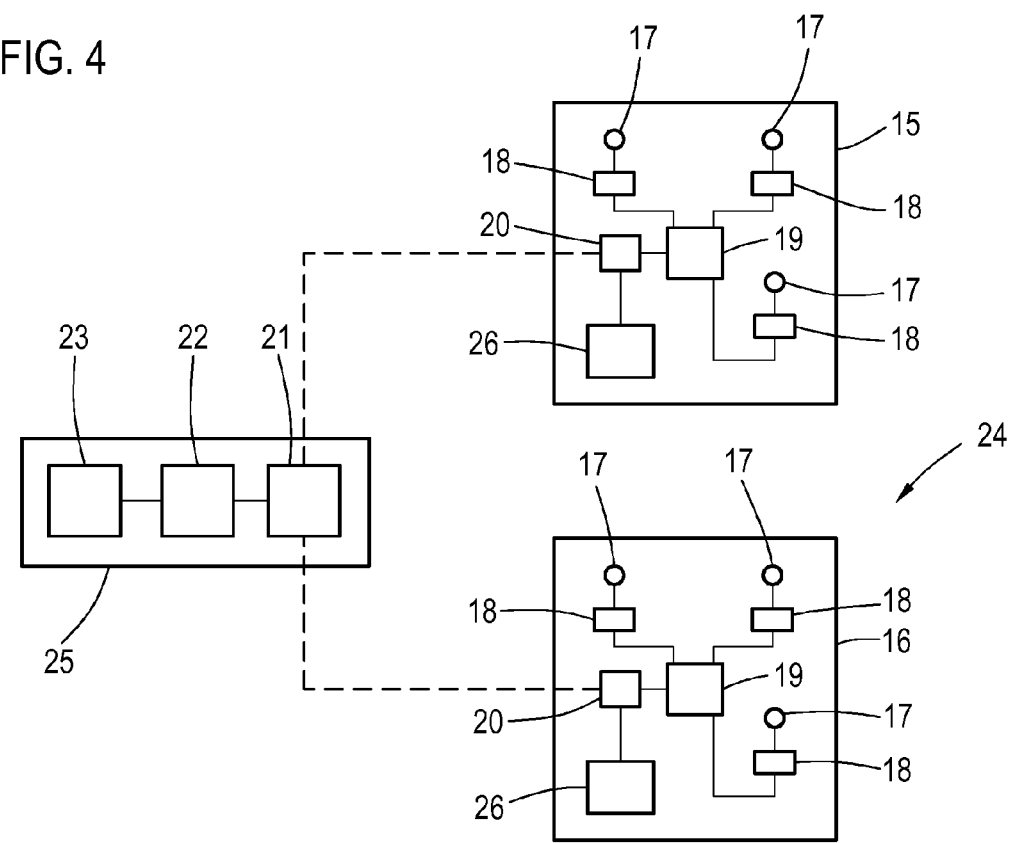
FIG. 4 is a block diagram of an exemplary embodiment of a locating device according to the invention.

As can be seen in the description of FIG. 3, the use of three receiving antennas in a cluster of receiving antennas provides definite advantages. With three receiving antennas an unambiguous direction can thus be determined. The measurement of time differences of points in time of reception between the clusters of receiving antennas is thereby no longer necessary. Short time measurement devices can be used that are disposed locally on individual receiving antenna clusters. Such an arrangement is schematically illustrated in FIG. 4. A location device 24 contains two clusters of receiving antennas 15 and 16 and a central unit 25. The design of the clusters of receiving antennas 15 and 16 will be explained in more detail for the cluster of receiving antennas 15. The cluster of receiving antennas 15 contains three receiving antennas 17. Each of the receiving antennas 17 is an untuned dipole that is connected to a detection device 18 that contains an HF diode. Under the influence of normal background radiation the HF diode blocks the detection device 18 and no detection signal is triggered. If a high power microwave pulse is received by the receiving antenna 17, then the HF diode in the detection device 18 switches through and a receiving signal is sent to the short time measuring device 19.

A short time measuring device 19 contains three inputs, each connected to a detection device 18. Once a receiving signal is detected by one of the detection devices 18, a counter in the short time measuring device 19 begins to count. In addition, which of the detection devices 18 has triggered first is stored. The counter values during reception of another detection signal are stored and each is associated with the receiving channel of the receiving antenna or detection device 18. The short time measuring device 19 thus measures the sequence of detection by the detection devices 18 as well as the time intervals. It should be noted here that alternative embodiments are also possible that directly allocate pairs of detection devices to a respective short time measuring device.

The data of the short time measuring device 19 are then transmitted by a communications device 20 to the central unit 25. Another communications device 21 is disposed in the central unit 25. In this exemplary embodiment the transmission takes place wirelessly and digitally. Likewise the communications device 21 of the central unit 25 receives the time differences measured in the identically constructed cluster of receiving antennas 16. The communications unit 21 also provides the received time differences to a computing device 22. The computing device 22 can now determine a location from the time values in various ways. In this exemplary embodiment the calculation takes place by determining for a horizontally oriented parabola in the cluster of receiving antennas 15 and a vertically oriented parabola for the cluster of receiving antennas 16. The origin of the parabola can be specified in advance, e.g. by programming in the locations of the clusters of receiving antennas following installation of the locating device, but it can also be provided to equip the clusters of receiving antennas with a location determination device 26. In this case on detection of a high power microwave pulse, e.g. by means of a GPS receiver and other location determining instruments, the accurate location of the cluster of receiving antennas can be determined and also transmitted by the communications device 20 to the central unit 25. The mobile use of the locating device is thereby easily possible.

Because the location determination in the present exemplary embodiment is mathematically definitely overdetermined, the consistency and quality of location determination can additionally be determined by the computing device 22. It is thus e.g. possible that in the event of poor quality of the signal a larger radius is determined in which the source is located and in the event of good quality a smaller radius. In the absence of certain signals, which is e.g. possible through the failure of individual clusters of receiving antennas, then the computing device can also fall back exclusively on the data from a cluster of receiving antennas. The result of the evaluation of the points in time of reception by the computing device 22 can then be illustrated on a display device 23 or can be used to control other equipment.

Figure 5:
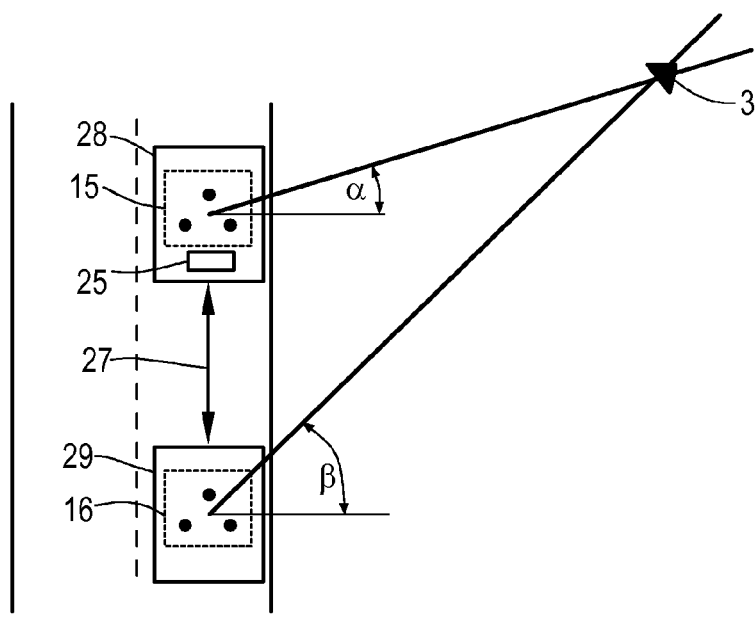
FIG. 5 is a schematic illustration of another exemplary embodiment of the locating device according to the invention.

FIG. 5 shows another exemplary embodiment of the locating device. Here the two clusters of receiving antennas 15, 16 are disposed on two vehicles 28, 29. Here it is particularly advantageous if when travelling with a convoy to be protected at least the first and the last vehicle 28, 29 are equipped with a cluster of receiving antennas 15, 16. In addition, one of the vehicles can contain the central unit 25. It is also possible, however, that the central unit 25 is integrated into one of the clusters of receiving antennas 15, 16. The clusters of receiving antennas 15, 16 and the central device 25 are connected by a wireless data link 27. If an attack by a short-duration high power microwave pulse now occurs, then a direction $\alpha$, $\beta$ from which the attack is taking place can be determined by each of the clusters of receiving antennas 15, 16. A position of the source of the short-duration high power microwave pulse can be definitely determined by the central unit 25 from the two directions $\alpha$, $\beta$. Determination of the origin of an attack in real time is thereby possible.

Figure 6:
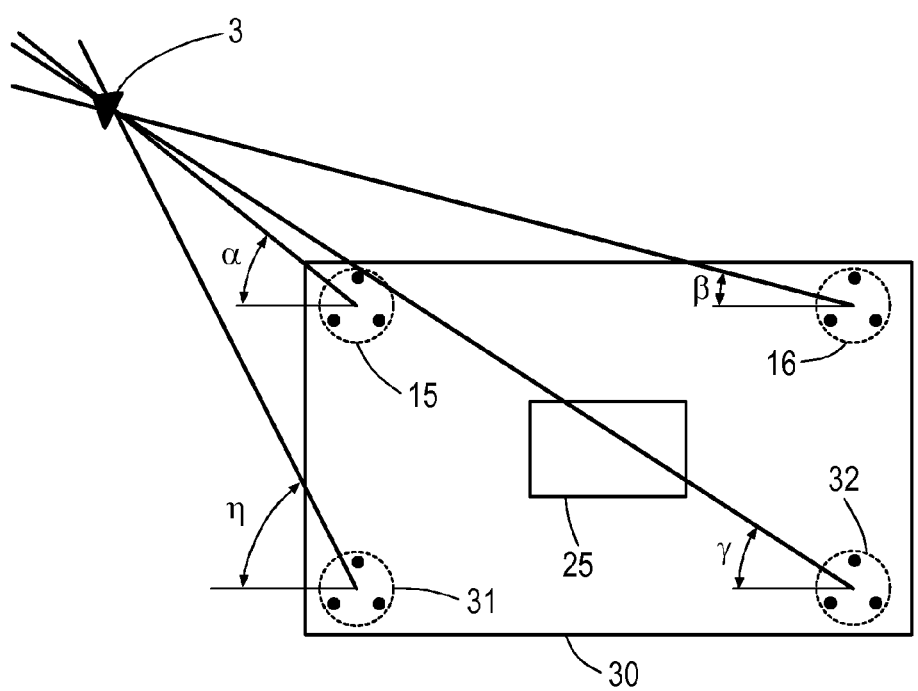
FIG. 6 is a schematic illustration of a third exemplary embodiment of the locating device according to the invention.

FIG. 6 shows another exemplary embodiment of the locating device. Here four clusters of receiving antennas 15, 16, 31 and 32 are disposed on a building 30. An attack by a short-duration high power microwave pulse emitting source 3 also takes place in this case. The four clusters of receiving antennas 15, 16, 31 and 32 are wirelessly connected to the central unit 25. If the high power microwave pulse is received by all four clusters of receiving antennas 15, 16, 31 and 32, the four angles $\alpha$, $\beta$, $\eta$ and $\epsilon$ can be determined. As a result of the overdetermination of the location of the source 3, receiver failures of individual clusters of receiving antennas can thereby be compensated. It is thus possible that the cluster of receiving antennas 32 lies in the shadow of the building for the indicated position of the source 3. In some adverse circumstances it can however occur that the cluster of receiving antennas 32 receives a signal that was e.g. reflected at another building. In this case a false angle $\gamma$ would result. Because, however, the directions of the clusters of receiving antennas 15, 16 and 31 also meet the location of the source 3, it could be determined that a correct signal is not received by the cluster of receiving antennas 32 and this could be excluded from the calculation of the location of the source.

The invention claimed is:

1. A locating device for locating a short-duration high power microwave pulse emitting source, the locating device comprising:
    detection devices;
    at least three separately disposed receiving antennas that are not disposed on a line and each coupled to one of said detection devices for detecting a point in time of reception at said antennas of high power microwave pulses;
    at least one short time measuring device for determining at least two time differences between points in time of reception of each two of said detection devices; and
    a computing device for calculating a location of an origin of the high power microwave pulse based on the at least two time differences measured.

2. The locating device according to claim 1, wherein:
    said receiving antennas are untuned dipoles; and
    said detection devices contain an HF diode whose response threshold is at least so high that said HF diode, in relation to a short time integral over a few nanoseconds, only forward conducts above a reception field strength of a permanent background radiation.

3. The locating device according to claim 1, wherein said receiving antennas define at least two separately disposed clusters of said receiving antennas, each of said clusters of said receiving antennas contains at least two said receiving antennas.

4. The locating device according to claim 3, wherein a distance between each two said clusters of said receiving antennas is at least twice as large as a distance between said receiving antennas within a cluster of said receiving antennas.

5. The locating device according to claim 3, wherein said short time measuring device is one of a plurality of short time measurement devices each disposed in one of said clusters and designed for measurement of the time differences between the points in time of reception of said detection devices associated with said receiving antennas of a same cluster of said receiving antennas.

6. The locating device according to claim 4, wherein said computing device determines an area of origin, which includes a location of the origin of the high power microwave pulse to be calculated, for each of said clusters of said receiving antennas and the location of the origin is determined as an intersection of at least two areas of origin.

7. The locating device according to claim 4, wherein a calculated area of the origin is in a form of one or two half-lines or a hyperbola, wherein a width of an area perpendicular to a half-line or the hyperbola corresponds to a tolerance interval.

8. The locating device according to claim 5, further comprising a communications device, said computing device is configured for wired or wireless reception of data from at least some of said short time measurement devices or another computing device by means of said communications device, wherein the data include the time differences, variables calculated from the time differences, and variables that describe areas of origin.

9. The locating device according to claim 1, wherein said receiving antennas define at least two separately disposed clusters of said receiving antennas, each of said clusters of said receiving antennas contain at least three said receiving antennas.

10. The locating device according to claim 3, wherein a distance between each two said clusters of said receiving antennas is at least three times as large as a distance between said receiving antennas within a cluster of said receiving antennas.

* * * * *